United States Patent
Ono et al.

[11] Patent Number: 5,281,264
[45] Date of Patent: Jan. 25, 1994

[54] SALT-FORMING TYPE DYE AND INK COMPOSITION

[75] Inventors: Takashi Ono, Takatsuki; Tatsuya Yagyu, Neyagawa; Tetsui Akase, Moriguchi, all of Japan

[73] Assignee: Orient Chemical Industries, Ltd., Japan

[21] Appl. No.: 35,596

[22] Filed: Mar. 23, 1993

[30] Foreign Application Priority Data

Mar. 31, 1992 [JP] Japan .................. 4-076643

[51] Int. Cl.$^5$ .............................................. C09D 11/02
[52] U.S. Cl. ................................. 106/22 K; 534/761
[58] Field of Search .................. 106/22 K; 534/761

[56]  References Cited
U.S. PATENT DOCUMENTS

| | | | |
|---|---|---|---|
| 4,432,900 | 2/1984 | Pociluyko | 106/22 K |
| 4,713,113 | 12/1987 | Shimada et al. | 106/22 K |

FOREIGN PATENT DOCUMENTS

| | | | |
|---|---|---|---|
| 67677 | 4/1982 | Japan | 106/22 K |
| 226072 | 12/1984 | Japan | 106/22 K |
| 215082 | 10/1985 | Japan | 106/22 K |
| 156180 | 7/1987 | Japan | 106/22 K |

*Primary Examiner*—Helene Klemanski
*Attorney, Agent, or Firm*—Birch, Stewart, Kolasch & Birch

[57] ABSTRACT

The present invention provides a salt forming-type dye represented by the formula:

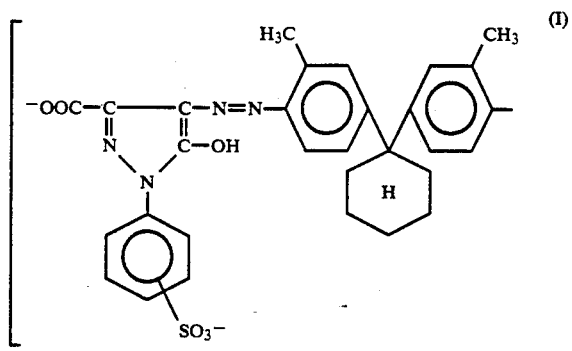
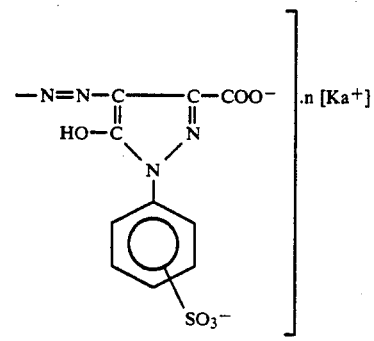

wherein Ka$^+$ is a C$_{6-20}$ amine cation or a basic dye cation, and n is an integer of 1 to 4, which indicates the number of Ka$^+$. The salt-forming dye can be used in an ink composition.

20 Claims, 3 Drawing Sheets

SALT-FORMING TYPE DYE AND INK COMPOSITION

FIELD OF THE INVENTION

The present invention relates to a novel salt-forming type dye useful for writing ink, recording ink, stamping ink, printing ink and the like. Particularly, it relates to a yellow disazo salt-forming type dye having excellent solubility to a hydrophilic organic solvent (e.g. alcohol, glycol, etc.) and a salt-forming type dye for various colors wherein a salt-formable yellow acidic dye is used in combination with a basic dye.

BACKGROUND OF THE INVENTION

Heretofore, as the writing ink, jet printing ink or printing ink used for recording on materials to be recorded (e.g. paper, etc.), compositions in which various dyes or pigments are dissolved or dispersed in a liquid medium or binder have been employed.

Among them, an organic pigment-dispersed type ink has an advantage that it is superior in fastness properties (e.g. light resistance, etc.). However, in the pigment-dispersed type ink, precipitation or aggregation of the pigment is liable to be arisen with time. Accordingly, a complicated anti-degeneration treatment (e.g. dispersion processing, etc.) is required in the production process, which results in increase of production cost.

On the other hand, the production process of an oily ink or aqueous ink in which the dye is dissolved requires no troublesome dispersion processing treatment. Therefore, the dye-dissolved type ink can be easily produced in comparison with the pigment-dispersed type ink. However, the dye-dissolved type oily ink has a problem of solvent toxicity, and the dye-dissolved type aqueous ink has a problem that it requires a long drying time and has poor flexibility. Accordingly, dyes having excellent solubility to hydrophilic solvent (e.g. alcohol, etc.) have hitherto been requested.

As the dye which satisfies these requirements, for example, various alcohol-soluble dyes such as salt-formed dyes of basic dyes (e.g. auramine, rhodamine, etc.) with acidic dyes; dyes wherein basic dyes are treated with fatty acids; metal complex-containing dyes having water-soluble groups (e.g. sulfone group, etc.); dyes wherein acidic dyes (e.g. acid yellow 23 and 42, acid red 73, etc.) are treated with organic amines and the like are known.

However, the conventional oily ink wherein the alcohol-soluble dye is used is inferior in dissolution stability with time (due to changes of environmental conditions such as temperature, humidity and the like) and fastness properties (e.g. light and water resistance).

OBJECTS OF THE INVENTION

One object of the present invention is to provide a novel salt-forming type dye having excellent solubility to a hydrophilic organic solvent (e.g. alcohol, glycol, etc.).

Another object of the present invention is to provide an ink composition containing the salt-forming type dye, which is superior in dissolution stability with time and fastness properties of writing (e.g. light and water resistance).

These objects as well as other objects and advantages of the present invention will become apparent to those skilled in the art from the following description with reference to the accompanying drawings.

SUMMARY OF THE INVENTION

According to the present invention, there is provided a salt-forming type dye represented by the formula:

[wherein $Ka^+$ is a $C_{6-20}$ amine cation or a basic dye cation, and n is an integer of 1 to 4, which indicates the number of $Ka^+$].

DETAILED EXPLANATION OF THE INVENTION

It is preferred that the salt-forming type dye represented by the formula (I) of the present invention is obtained by salt-forming a water-soluble disazo dye containing a carboxyl group and a sulfone group (hereinafter referred to as "anion component") which is represented the formula:

(II)

[wherein M is hydrogen or alkali metal] with amine or basic dye (hereinafter referred to as "cation component").

The anion component which can be used in the present invention is a water-soluble dye. This is a salt-formable yellow dyestuff wherein bis-diazotizable 4,4'-cyclohexylidenedi-o-toluidine is used as a base (hereinafter referred to as "C-base") and pyrazolone derivative having at least carboxy group and sulfone group [e.g. 1-(sulfophenyl)-3-carboxy-5-pyrazolone, etc.]is used as a coupling component. The anion component is obtained by bis-diazotizing the C-base (1 mol), followed by coupling with pyrazolone derivative (2 mols).

The anion component can be easily separated from a reaction system in the acid form, by acid salting-out. When the anion component is separated in the form of sodium salt or potassium salt, the component can be converted into the acid form by treating in an alcohol-hydrochloric acid solution.

The C-base is synthesized, for example, by a method as described in GB No. 1,183,544. That is, it is obtained by reacting cyclohexanone with o-toluidine in an acidic hydrochloric acid solution at 90° to 120° C. for 8 to 15 hours. If necessary, the crude C-base thus obtained is purified with an organic solvent. When the unpurified C-base is used as an intermediate, a dyestuff having clear color is not obtained, occasionally.

Amine which can be used as the cation component is preferably aliphatic or alicyclic amine, alkanolamine derivative and guanidine derivative having 6 to 20 carbon atoms. When water-miscible dimethylamine, diethylamine, propylamine or ethanolamine having 6 carbon atoms or less is used, the resulting salt-forming type dye lacks in lipophilic nature.

Amine which can be suitably used as the cation component is in the from of free amine, and examples thereof include aliphatic amines [e.g. hexylamine, heptylamine, octylamine, 2-ethylhexylamine, di-(2-ethylhexyl)amine, dodecylamine, etc.]; alicyclic amines [e.g. cyclohexylamine, di-cyclohexylamine, etc.]; alkoxyalkylamines [e.g. 3-propoxypropylamine, di-(3-ethoxypropyl)amine, 3-butoxypropylamine, octoxypropylamine, 3-(2-ethylhexyloxy)propylamine, etc.]; alkanol group-containing amines [e.g. N-cyclohexylethanolamine, N-dodecylethanolamine, N-dodecylimino-diethanol, etc.]; diamines [e.g. diethylaminopropylamine, dibutylaminopropylamine, etc.]; guanidine (derivatives) [e.g. 1,3-diphenylguanidine, 1-o-tolylguanidine, di-o-tolylguanidine, etc.]and the like.

As the cation component, various basic dyes can also be used. The basic dye used in the present invention may be anyone which has clear color and excellent light resistance and is not specifically limited. There are many basic dyes having clear color, however, there are few basic dyes having excellent light resistance. Accordingly, as the basic dye which is suitably used, for example, there are lightfast basic dyes (e.g. rhodamine, triphenylmethane, etc.).

In order to obtain a salt-forming type dye having excellent solubility to alcohol and glycol solvents as well as clear color and excellent light resistance, the following basic dyes can be suitably used, particularly.

C.I. Basic Yellow 2
C.I. Basic Yellow 11
C.I. Basic Yellow 51
C.I. Basic Orange 2
C.I. Basic Orange 21
C.I. Basic Orange 22
C.I. Basic Red 1
C.I. Basic Red 12
C.I. Basic Red 13
C.I. Basic Violet 10
C.I. Basic Violet 1
C.I. Basic Blue 7
C.I. Basic Blue 1

The alcohol-soluble dye is obtained by salt-forming the anion component represented by the formula (II) with amine and/or basic dye as the cation component. All methods which are known to the art can be used for the salt-forming operation. For example, a water-soluble anion dye of the formula (II) (1 mol) as the anion component is dissolved in water to form a 2 to 10% solution, to which was added dropwise an aqueous solution of amine or basic dye as the cation component (mols corresponding to the number of acid group of anion dye), followed by stirring under acidic atmosphere for 1 to 5 hours to obtain an alcohol-soluble dye of the present invention.

In this case, the cation component (up to 4 mols) can be used based on the anion component (1 mol). When the amount of the cation component exceeds 4 mols, an unreacted cation component can be included and a rinsing step (e.g. desalting, etc.) requires long time, and it is not preferred. In the case of salt-forming with amine, it is particularly preferred to use the cation component in an amount of about 4 mols. On the other hand, in the case of salt-forming with the basic dye, a salt-forming type dye having desired solubility can be obtained using the cation component, preferably in an amount of 2 to 4 mols, more preferably 3 to 4 mols.

In the case of using amine as the cation component, the cation component is generally used in the salt form of inorganic acids (e.g. hydrochloric acid, sulfuric acid, etc.) or organic acids (e.g. formic acid, acetic acid, etc.). However, the reaction may be conducted by directly adding in the form of free amine.

The reason that a neutralization amount of the cation component is not particularly required is not clear. However, it is considered that polarity of the carboxyl group is small in comparison with the sulfone group and, therefore, it has not a substantial influence on solubility to alcohol and glycol. In general, the sulfone group is preferentially or selectively salt-formed with the basic substance in comparison with the carboxy group. In the salt-forming type dye of the present invention thus obtained, the carboxyl group can be optionally remained in the form of free acid and, therefore, the dye is superior in affinity or solubility to various hydrophilic organic solvents.

The present invention also provides an ink composition comprising the salt forming type dye of the formula (I) and an oily liquid medium. It is preferred that the oily liquid medium used in the ink composition is an organic solvent which contains alcohol and/or glycol (including ether of glycol or ester) as a main component, because a non-pollutional ink comprising an alcoholic solvent as the liquid medium can be provided.

As the alcoholic organic solvent used for the oily liquid solvent, for example, there are monovalent alcohols [e.g. alcohols such as ethanol, n-propanol, isopropanol, n-butanol, amyl alcohol, benzyl alcohol, cyclohexanol and diacetone alcohol; monoalkyl ethers of glycols such as ethylene glycol monomethyl ether, ethylene glycol monoethyl ether, propylene glycol monoethyl ether, diethylene glycol monoethyl ether, diethylene glycol monobutyl ether and dipropylene glycol monoethyl ether; monoacetates of glycols such as ethylene glycol monoacetate and propylene glycol monoacetate, etc.], divalent alcohols [e.g. glycols such as ethylene glycol, diethylene glycol, trimethylene glycol, triethylene glycol, tetraethylene glycol, polyethylene glycol, propylene glycol and butanediol, etc.] and the like.

In the present invention, by formulating organic solvents such as low-toxic or nontoxic ethanol, n-propanol, isopropanol, benzyl alcohol, ethylene glycol, phenyl glycol, propylene glycol monoalkyl ether and lactate in a suitable amount, an ink having no problem about environmental health can be prepared.

As the oily liquid medium, lactates such as methyl lactate, ethyl lactate, butyl lactate and the like can also be used in an amount of 30% by weight or less based on the total weight of the ink composition, in addition to the alcoholic organic solvent. Further, pyrrolidones such as N-(2-hydroxyethyl)-2-pyrrolidone, N-methyl-pyrrolidone, 2-pyrrolidone and the like can also be used in an amount of 15% by weight or less based on the total weight of the ink composition.

The ink composition of the present invention can be obtained by dissolving 1 to 30% by weight (preferably 5 to 10% by weight) of the salt-forming type dye of the present invention in a liquid medium comprising 60 to 95% by weight (preferably 75 to 85% by weight) of the above organic solvent and 5 to 15% by weight (preferably 8 to 12% by weight) of a resin for ink with heating, followed by filtration. Each amount is based on the total weight of the ink composition. In this case, small amount of additives (e.g. nonionic surfactant, rust preventive, etc.) may be optionally added.

The amount of the salt-forming type dye contained in the ink composition of the present invention varies depending upon the applications of the ink. In general, the amount may be 15 to 25% by weight for a ball point pen, 5 to 15% by weight for a marking pen and 3 to 10% by weight for ink-jet recording.

The resin which can be suitably used in the ink composition of the present invention may be alcohol-soluble resin. Examples thereof include lower condensate of vinyl pyrrolidone, alkyd resin, acrylic resin, phenol resin, styrene maleic resin, ketone resin, rosin resin and the like.

The following Examples and Comparative Examples further illustrate the present invention in detail but are not to be construed to limit the scope thereof. In the Examples and Comparative Examples, all "parts" are by weight unless otherwise stated.

In Examples 1 to 6, preparation of a salt-forming type dyes of the present invention will be explained.

EXAMPLE 1

Synthesis of Intermediate C-base o-Toluidine (160 parts, 1.5 mols) and hydrochloric acid (100 parts) were mixed with stirring. To the mixture, cyclohexanone (50 parts, 0.5 mols) was added and stirred at 90° to 110° C. for 8 hours to conduct the condensation reaction. Then, a 45% aqueous sodium hydroxide solution (50 parts) was added and the unreacted o-toluidine was recovered by steam distillation, followed by cooling to obtain 4,4'-cyclohexylidene-o-toluidine as a solid intermediate. The intermediate was purified with a solvent to obtain 100 parts of a white crystal.

Figure 1:
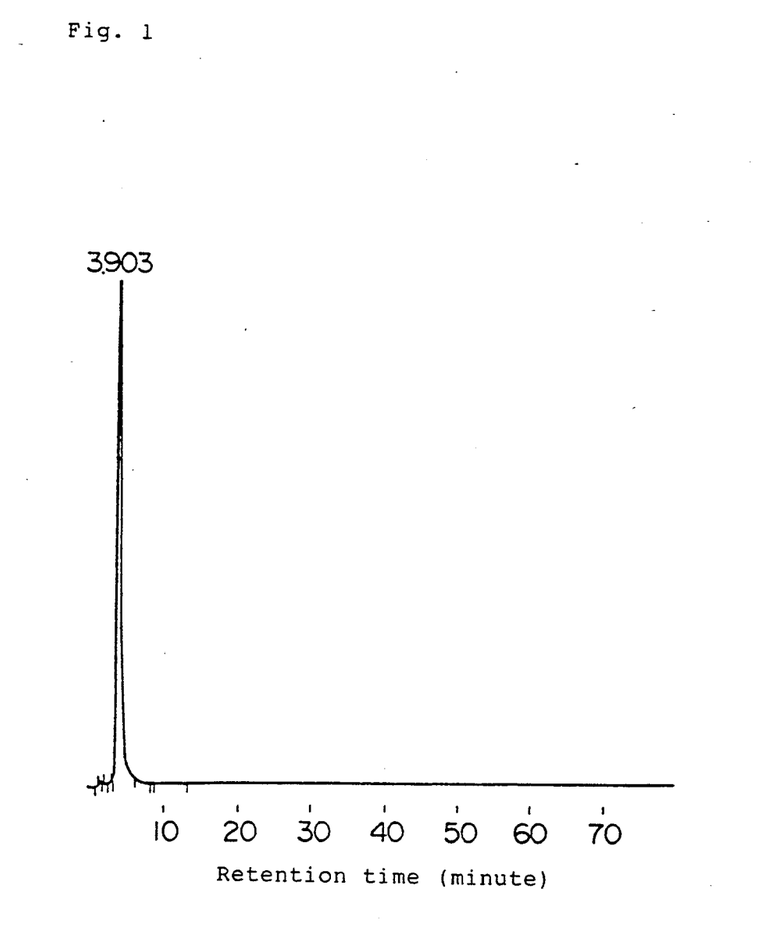
FIG. 1 is a graph illustrating a high performance liquid chromatography of an intermediate C-base obtained in Example 1.

The resulting intermediate C-base was subjected to a high performance liquid chromatography (HPLC). The analysis results are shown in FIG. 1.

HPLC Analysis Conditions of Intermediate C-base

Column: RP-18, 5μ (diameter: 4.7 mm, length: 150 mm)
Temperature: 50° C.
Flow rate: 1.3 ml/mil
Sensing wavelength: 254 nm

| Carrier: | |
| --- | --- |
| $CH_3CN$ | 65 ml |
| $H_2O$ | 35 ml |
| Triethanolamine | 1 ml |
| $CH_3COOH$ | 3 ml |
| (0.02 N, $KH_2PO_3$) | |

Concentration of sample: 10 mg/10 ml carrier
Pour: 5 μl

Synthesis of Anion Component

The resulting intermediate (88 parts, 0.3 mols) was biazotized by a normal method and subjected to coupling with 1-(sulfophenyl)-3-carboxy-5-pyrazoline (170 parts, 0.6 mols) at pH 7.5 to 8.5 (alkaline), followed by acid salting-out, filtration, rinsing and further drying to obtain 200 parts of a yellow anion component (Na salt). The analysis results of a thin-layer chromatography (TLC) shows that the component has one spot.

TLC Analysis Conditions

Developing solvent: pyridine/n-butanol/water=1/1/1
Thin-layer: DC-Fertigplotten cellulose F (manufactured by MERCK Co.)

Synthesis of Salt-forming Type Dye

The resulting anion component (88 parts, 0.1 mols) was dissolved in water, followed by filtration to form a 5% solution.

To the solution, an aqueous solution (pH 3 to 4) of 3-(2-ethylhexyloxy)propylamine (75 parts, 0.4 moles) as a cation component in acetic acid was added dropwise with stirring over 50 minutes, followed by stirring at 5° to 10° C. for 3 hours to obtain 135 parts of a yellow salt-forming type dye (dye 1, n average value: 2.5). It was confirmed that the resulting dye is a salt-forming type dye having n (2<n<3).

Figure 2:
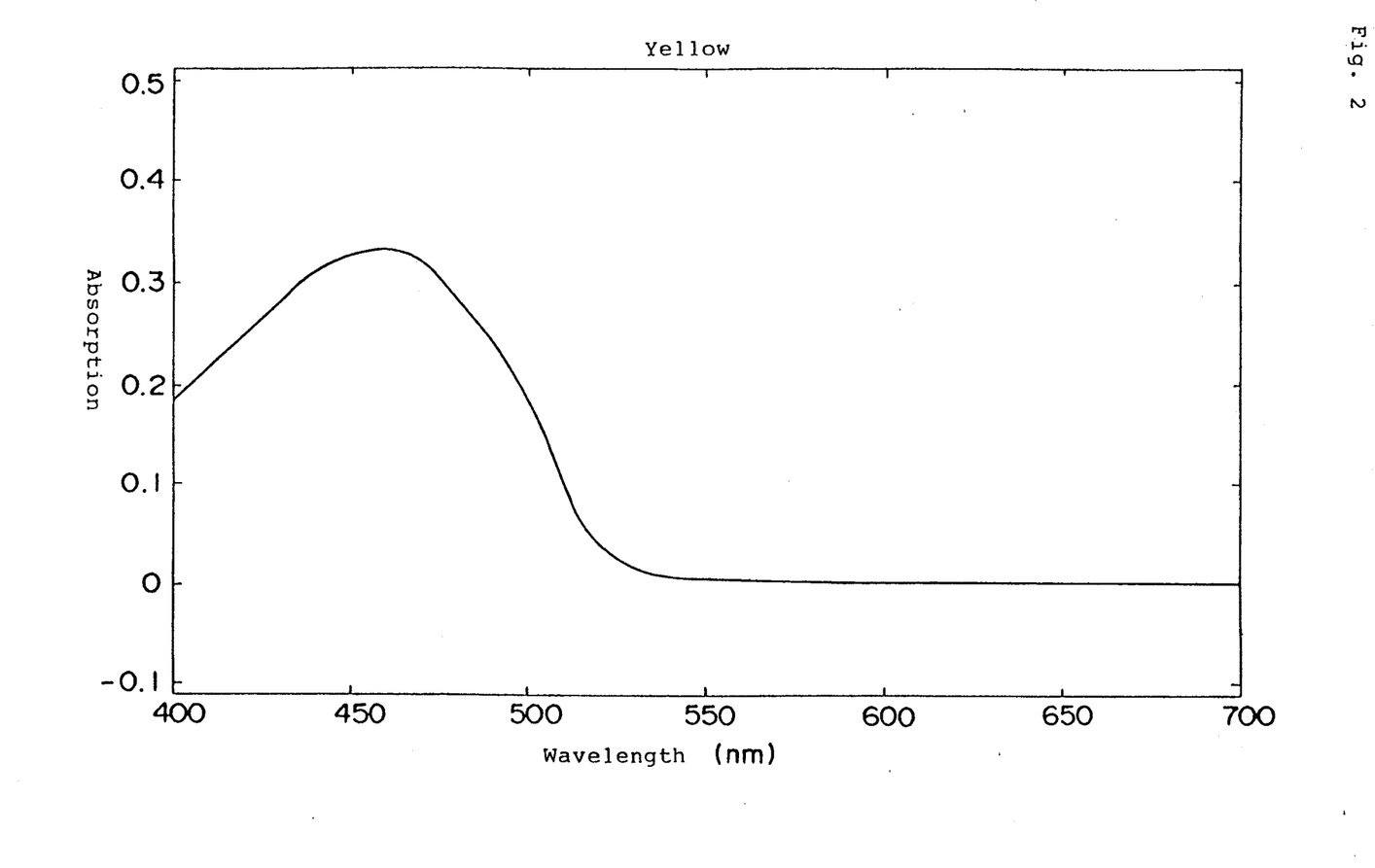
FIG. 2 is a graph illustrating a visible absorption spectrum of a salt-forming type dye 1 obtained in Example 1.

A structure of the dye is shown in the following formula, and hue and maximum absorption wavelength ($\lambda_{max}$) are shown in Table. 1. A visible absorption spectrum (in methanol solvent) is shown in FIG. 2.

wherein $2 \leq n \leq 3$

EXAMPLES 2 and 3

According to the same manner as that described in Example 1 except for using a cation component (0.4 mols) shown in Table. 1 in place of 3-(2-ethylhexyloxy)-propylamine used in Example 1, salt-forming type dyes of Examples 2 and 3 were obtained.

A structure of each salt-forming type dye is shown in the following formula, respectively. Hue and maximum absorption wavelength ($\lambda_{max}$) are shown in Table. 1.

EXAMPLE 4

The anion component (88 parts, 0.1 mols) obtained in Example 1 was dissolved in water, followed by filtration to prepare a 5% dyestuff solution.

Rhodamine 6 GCP (C.I. Basic Red) (140 parts, 0.3 mols) as a cation component was dissolved in water with stirring to prepare a 3% aqueous solution, which was then filtered. Thereafter, this solution (pH 2 to 4) was added dropwise to the dyestuff solution over 50 minutes, followed by stirring at 40° to 50° C. for 3 hours. The solution was heated to 65° C. to form a grit, followed by filtration, rinsing and further drying to obtain 200 parts of a powdered red salt-forming type dye (dye 4) having a structure of the following formula. It was confirmed that the resulting dye is a salt-forming type dye having n (2<n<3). Hue and maximum absorption wavelength ($\lambda_{max}$) are shown in Table. 1.

wherein $2 \leq n \leq 3$ wherein $3 \leq n \leq 4$ wherein 2 ≦ n ≦ 3

Figure 3:
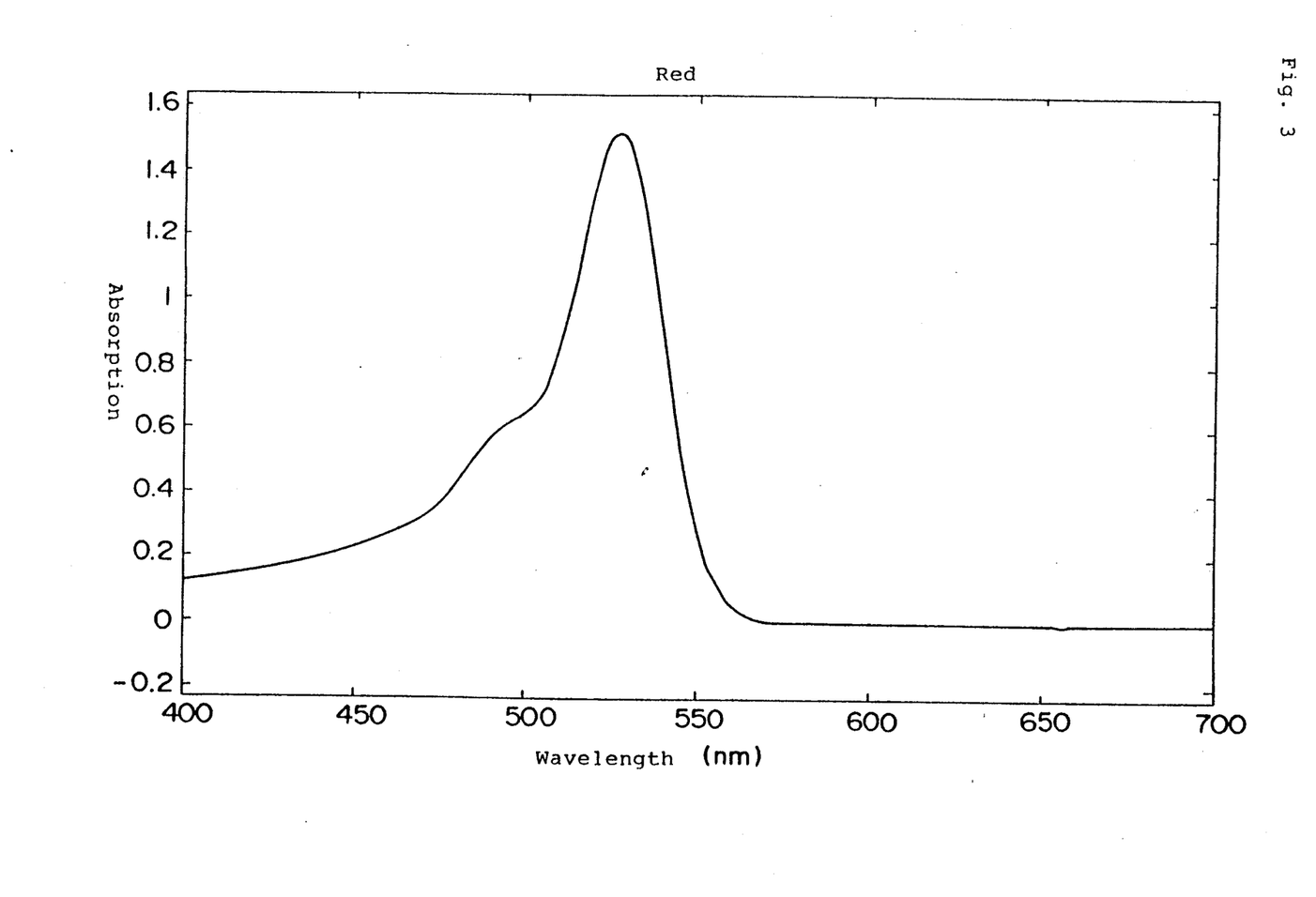
FIG. 3 is a graph illustrating a visible absorption spectrum of a salt-forming type dye 4 obtained in Example 4.

Further, a visible absorption spectrum (in methanol solvent) is shown in FIG. 3.

EXAMPLE 5

According to the same manner as that described in Example 4 except for rhodamine 4G (C.I. Basic Red) (190 parts, 0.4 mols) as a cation component shown in Table. 1 in place of rhodamine 6 GCP (C.I. Basic Red) used in Example 4, a red salt-forming type dye (dye 5) was obtained.

It was confirmed that the resulting dye has a structure

EXAMPLE 6

According to the same manner as that described in Example 4 except for methyl violet (C.I. Basic Violet) (145 parts, 0.4 mols) as a cation component shown in Table. 1 in place of rhodamine 6 GCP (C.I. Basic Red) used in Example 4, a violet salt-forming type dye (dye 6) was obtained.

It was confirmed that the resulting dye has a structure of the following formula. Hue and maximum absorption wavelength ($\lambda_{max}$) are shown in Table. 1.

wherein 2 ≦ n ≦ 3 of the following formula. Hue and maximum absorption wavelength ($\lambda_{max}$) are shown in Table. 1.

COMPARATIVE EXAMPLES 1 To 4

According to the same manner as that described in Example 1 except for using acid yellow 42 (C.I. Acid Yellow 42) having a structure of the formula:

wherein 2 ≦ n ≦ 3 as an anion component and using a cation component (amine or basic dye) shown in Table. 1, salt-forming type dyes (dyes 7 to 10) having the following formula were obtained.

TABLE 1

| Cation component | Salt-forming type dye | |
|---|---|---|
| (Amine or basic dye) | Hue | $\lambda_{max}$ (nm) |
| Ex. 1 | 3-(2-Ethylhexyloxy)propylamine | Yellow | 458 |
| Ex. 2 | 2-Ethylhexylamine | Yellow | 460 |
| Ex. 3 | 1,3-Diphenylguanidine | Yellow | 460 |
| Ex. 4 | Rhodamine 6GCP | Red | 528 |
| Ex. 5 | Rhodamine 4G | Red | 528 |
| Ex. 6 | Methylviolet | Violet | 580 |
| Comp. | 3-(2-Ethylhexyloxy)propylamine | Yellow | 422 |

TABLE 1-continued

| | Cation component (Amine or basic dye) | Salt-forming type dye Hue | $\lambda_{max}$ (nm) |
|---|---|---|---|
| Ex. 1 | | | |
| Comp. Ex. 2 | 1,3-Diphenylguanidine | Yellow | 422 |
| Comp. Ex. 3 | Rhodamine 6GCP | Red | 525 |
| Comp. Ex. 4 | Methylviolet | Violet | 578 |

EXAMPLE 7

In this Example, solubility of salt-forming type dyes obtained in Examples 1 to 6 (dyes 1 to 6) and salt-forming type dyes obtained in Comparative Examples 1 to 4 (dyes 7 to 10) to alcoholic organic solvent will be explained.

A dye was added to a solvent (100 parts) with stirring by means of a magnet stirrer and the solution was spotted on a filter paper No.2 (manufactured by Toyo Roshi Co.) to examine a saturation concentration. Regarding a sample wherein ethylene glycol and a mixed solvent (phenyl glycol: benzyl alcohol: oleic acid=4:1:1) were used, spotting was conducted after heating to 70° to 80° C. The results are shown in Table. 2.

Each value in Table. 2 is solubility (% by weight) of a salt-forming type dye to various solvents.

TABLE 2

| Salt-forming type dye No. | Ethanol | n-Propanol | Ethylene glycol | Mixed solvent[a] |
|---|---|---|---|---|
| 1 | 25 | 20 | 30 | 40 |
| 2 | 10 | 5 | 30 | 35 |
| 3 | 10 | 5 | 30 | 30 |
| 4 | 15 | 10 | 30 | 40 |
| 5 | 20 | 15 | 30 | 40 |
| 6 | 10 | 5 | 30 | 40 |
| 7 | 7 | 3 | 15 | 10 |
| 8 | 5 | 3 | 15 | 15 |
| 9 | 5 | 2 | 15 | 20 |
| 10 | 1 | 1 | 10 | 30 |

[a]Phenyl glycol:benzyl alcohol:oleic acid = 4:1:1

In Examples 8 to 10, properties of an ink for alcohol marking pen prepared by using a salt-forming type dye of the present invention will be explained.

EXAMPLE 8

| | Amount (parts) |
|---|---|
| Salt-forming type dye (dye 1) | 6 |
| Ethanol | 66 |
| Benzyl alcohol | 5 |
| Ethyl lactate | 10 |
| Ketone resin | 10 |

The above components were uniformly dissolved with mixing at 40° C. to obtain a yellow ink. Storage stability with time of this ink was examined with a low temperature/high temperature vessel (trade name "INCUBATOR", manufactured by Sanyo Denki Co.). After storage for 3 months (temperature range: −10° to 50° C., repeating time: 60 minutes), no precipitation of the dye and thickening of the ink composition were observed. Further, water and light resistance of writing were excellent as shown in Table. 3.

EXAMPLE 9

| | Amount (parts) |
|---|---|
| Salt-forming type dye (dye 4) | 7 |
| Ethanol | 71 |
| Benzyl alcohol | 5 |
| Ethyl lactate | 10 |
| Phenol resin | 7 |

The above components were uniformly dissolved with mixing at 60° C., followed by filtration to obtain a red ink. Stability with time was examined according to the same manner as that described in Example 8. As a result, no precipitation of the dye and thickening of the ink were observed. Further, water and light resistance of writing were excellent as shown in Table. 3.

EXAMPLE 10

| | Amount (parts) |
|---|---|
| Salt-forming type dye (dye 6) | 6 |
| Ethanol | 71 |
| Benzyl alcohol | 5 |
| Ethyl lactate | 10 |
| Phenol resin | 8 |

The above components were uniformly dissolved with mixing at 60° C., followed by precision filtration to obtain a violet ink. Stability with time was examined according to the same manner as that described in Example 8. As a result, no precipitation of the dye and thickening of the ink were observed. Further, water and light resistance of writing were excellent as shown in Table. 3.

EXAMPLE 11

In this Example, physical properties of an ink for oily ball point pen prepared by using a salt-forming type dye of the present invention will be explained.

| | Amount (parts) |
|---|---|
| Salt-forming type dye (dye 1) | 2 |
| Salt-forming type dye (dye 4) | 10 |
| Metal complex-containing dye (manufactured by Orient Chemical Industries Co. as Vslifast Orange 2210) | 11 |
| Phenyl glycol | 38 |
| Benzyl alcohol | 9.5 |
| Activator (manufactured by Daiichi Kogyo Seiyaku Co. as Plysurf P-208) | 5.5 |
| Polyvinyl pyrrolidone | 3 |
| Ketone resin (manufactured by Hitachi Kasei Co. as Hilack) | 21 |

The above components were uniformly dissolved with mixing at 60° C., followed by precision filtration to obtain a red ink. Stability with time was examined according to the same manner as that described in Example 8. As a result, no precipitation of the dye and thickening of the ink were observed. Further, water and light resistance of writing were excellent as shown in Table. 3.

COMPARATIVE EXAMPLE 5

According to the same manner as that described in Example 8 except for using a dye 7 in place of a salt-forming type dye (dye 1) of the present invention used in Example 8, a yellow ink was obtained. Stability with time of the ink and water and light resistance of writing were evaluated. The results are shown in Table. 3.

COMPARATIVE EXAMPLE 6

According to the same manner as that described in Example 9 except for using a dye 9 in place of a salt-forming type dye (dye 4) of the present invention used in Example 9, a red ink was obtained. Stability with time of the ink and water and light resistance of writing were evaluated. The results are shown in Table. 3.

COMPARATIVE EXAMPLE 7

According to the same manner as that described in Example 10 except for using a dye 10 in place of a salt-forming type dye (dye 6) of the present invention used in Example 10, a violet ink was obtained. Stability with time of the ink and water and light resistance of writing were evaluated. The results are shown in Table. 3.

TABLE 3

| Ink for alcohol marking pen | Stability with time of ink | Water resistance of writing | Light resistance of writing |
|---|---|---|---|
| Example 8 | A | A | A |
| Example 9 | A | A | C |
| Example 10 | B | B | B |
| Comp. Example 5 | D | A | A |
| Comp. Example 6 | D | D | D |
| Comp. Example 7 | D | B | B |

COMPARATIVE EXAMPLE 8

According to the same manner as that described in Example 11 except for using dyes 7 and 9 in place of salt-forming type dyes (dyes 1 and 4) of the present invention used in Example 11, a red ink was obtained. Stability with time of the ink and water and light resistance of writing were evaluated. The results are shown in Table. 4.

TABLE 4

| Ink for oily ball point pen | Stability with time of ink | Water resistance of writing | Light resistance of writing |
|---|---|---|---|
| Example 11 | A | A | B |
| Comp. Example 8 | D | C | C |

Evaluation Method of Stability With Time

An ink (30 ml) was placed in a glass bottle and stored for 3 months (temperature range: $-10°$ to $50°$ C., repeating time: 60 minutes) in a low temperature/high temperature vessel (manufactured by Sanyo Denki Co. as INCUBATOR). Thereafter, evaluation was conducted by observing whether precipitation of the dye and thickening of the ink are arisen or not, according to the following criteria:

A: excellent; B: good; C: slightly bad; D: bad.

Evaluation Method of Water Resistance

An ink was fed to a pen and writing was conducted on a writing paper (JIS P3201). When 30 minutes have passed after writing, the paper was dipped in a distilled water and taken out and dried. Then, writing was observed and evaluated according to the following criteria:

A: excellent; B: good; C: slightly bad; D: bad.

Evaluation Method of Light Resistance

An ink was fed to a pen and writing was conducted on a writing paper (JIS P3201). It was exposed to light for 5 hours in a long-life fadeometer (carbon-arc type. Then, writing was observed and evaluated according to the following criteria:

A: excellent; B: good; C: slightly bad; D: bad.

What is claimed is:

1. A salt-forming dye represented by the formula:

wherein $Ka^+$ is a $C_{6-20}$ amine cation or a basic dye cation, and n is an integer of 1 to 4, which indicates the number of $Ka^+$.

2. The salt-forming dye according to claim 1, which is obtained by reacting an aqueous dye represented by the formula:

wherein M is hydrogen or alkali metal, with a C6-20 amine or a basic dye.

3. An ink composition which comprises the salt-forming dye according to claim 1 and an oily liquid medium.

4. The salt-forming dye according to claim 1, wherein Ka+ is an amine cation having 6 to 20 carbon atoms and which is selected from the group consisting of aliphatic amines, alicyclic amines, alkoxy alkylamines, alkanol group-containing amines, diamines, and guanidines.

5. The salt-forming dye according to claim 1, wherein Ka+ is an amine cation selected from the group consisting of hexylamine, heptylamine, octylamine, 2-ethylhexylamine, di-(2-ethylhexyl)amine, dodecylamine, cyclohexylamine, di-cyclohexylamine, 3-propoxypropylamine, di-(3-ethoxypropyl)amine, 3-butoxypropylamine, octoxypropylamine, 3-(2-ethylhexyloxy)propylamine, N-cyclohexylethanolamine, N-dodecylethanolamine, N-dodecylimino-di-ethanol, diethylaminopropylamine, dibutylaminopropylamine, 1,3-diphenylguanidine, 1-o-tolylguanidine, an di-o-tolylguanidine.

6. The salt-forming dye according to claim 1, wherein Ka+ is a basic dye cation which is selected from rhodamines and triphenylmethanes.

7. The salt-forming dye according to claim 1, wherein Ka+ is a basic dye cation which is selected from the group consisting of C.I. Basic Yellow 2, C.I. Basic Yellow 11, C.I. Basic Yellow 51, C.I. Basic Orange 2, C.I. Basic Orange 21, C.I. Basic Orange 22, C.I. Basic Red 1, C.I. Basic Red 12, C.I. Basic Red 13, C.I. Basic Violet 10, C.I. Basic Violet 1, C.I. Basic Blue 7, and C.I. Basic Blue 1.

8. The salt-forming dye according to claim 1, wherein said dye is selected from the group consisting of:

wherein $2 \leq n \leq 3$;

wherein $2 \leq n \leq 3$;

wherein $3 \leq n \leq 4$;

wherein 2 ≤ n ≤ 3;

wherein 2 ≤ n ≤ 3 and wherein 2 ≤ n ≤ 3.

9. The ink composition according to claim 3, wherein said oily liquid medium comprises an alcoholic organic solvent selected from the group consisting of ethanol, n-propanol, isopropanol, n-butanol, amyl alcohol, benzyl alcohol, cyclohexanol, diacetone alcohol, ethylene glycol monomethyl ether, ethylene glycol monoethyl ether, propylene glycol monoethyl ether, diethylene glycol monoethyl ether, diethylene glycol monobutyl ether, dipropylene glycol monoethyl ether, ethylene glycol monoacetate, propylene glycol monoacetate, ethylene glycol, diethylene glycol, trimethylene glycol, triethylene glycol, tetraethylene glycol, polyethylene glycol, propylene glycol, and butanediol.

10. The ink composition according to claim 3, wherein said oily liquid medium comprises at least one compound selected from the group consisting of ethanol, n-propanol, isopropanol, benzyl alcohol, ethylene glycol, phenyl glycol, and propylene glycol monoalkyl ether.

11. The ink composition according to claim 10, wherein said oily liquid medium comprises ethanol and benzyl alcohol.

12. The ink composition according to claim 9, wherein said oily liquid medium further comprises a lactate in an amount greater than 0 but less than or equal to 30%, by weight, based on the total weight of the ink composition.

13. The ink composition according to claim 12, wherein said lactate is selected from the group consisting of methyl lactate, ethyl lactate, and butyl lactate.

14. The ink composition according to claim 9, wherein said oily liquid medium further comprises a pyrrolidone in an amount greater than 0 but less than or equal to 15%, by weight, based on the total weight of the ink composition.

15. The ink composition according to claim 14, wherein said pyrrolidone is selected from the group consisting of N-(2-hydroxyethyl)-2-pyrrolidone, N-methyl pyrrolidone, and 2-pyrrolidone.

16. The ink composition according to claim 3, wherein said oily liquid medium comprises an alcohol-soluble resin and an organic solvent.

17. The ink composition according to claim 16, wherein said alcohol-soluble resin is selected from the group consisting of alkyd resin, acrylic resin, phenol resin, styrene maleic resin, ketone resin and rosin resin.

18. The ink composition according to claim 8, wherein said oily liquid medium further comprises an alcohol-soluble resin selected from the group consisting of alkyl resin, acrylic resin, phenol resin, styrene maleic resin, ketone resin, and rosin resin.

19. The ink composition according to claim 3, wherein said salt-forming dye is contained in said ink composition in an amount of from 15 to 25%, by weight, based on the total weight of the ink composition.

20. The ink composition according to claim 3, wherein said salt-forming dye is contained in said ink composition in an amount of from 3 to 10%, by weight, based on the total weight of the ink composition.

* * * * *